US010635889B2

(12) United States Patent
Herd et al.

(10) Patent No.: US 10,635,889 B2
(45) Date of Patent: Apr. 28, 2020

(54) DISPLAYING A SUBJECT COMPOSITION

(71) Applicants: Rolf Herd, Salt Lake City, UT (US);
Joshua Quinton, Lake Forest, IL (US)

(72) Inventors: Rolf Herd, Salt Lake City, UT (US);
Joshua Quinton, Lake Forest, IL (US)

( * ) Notice: Subject to any disclaimer, the term of this patent is extended or adjusted under 35 U.S.C. 154(b) by 259 days.

(21) Appl. No.: 15/857,490

(22) Filed: Dec. 28, 2017

(65) Prior Publication Data
US 2018/0189548 A1 Jul. 5, 2018

Related U.S. Application Data

(60) Provisional application No. 62/440,260, filed on Dec. 29, 2016.

(51) Int. Cl.
*G06K 9/00* (2006.01)
*G06T 7/70* (2017.01)

(52) U.S. Cl.
CPC ..... *G06K 9/00228* (2013.01); *G06K 9/00369* (2013.01); *G06T 7/70* (2017.01); *G06T 2207/30201* (2013.01)

(58) Field of Classification Search
CPC .. G06K 9/00228; G06K 9/00369; G06T 7/70; G06T 2207/30201
See application file for complete search history.

(56) References Cited

U.S. PATENT DOCUMENTS

| 2013/0108171 | A1* | 5/2013 | Ptucha | G06K 9/00228 382/195 |
| 2016/0063314 | A1* | 3/2016 | Samet | G06K 9/00288 348/78 |
| 2016/0301813 | A1* | 10/2016 | Swire | H04N 1/00188 |

OTHER PUBLICATIONS

Andrew C. Gallagher and Tsuhan Chen: "Using Context to Recognize People in Consumer Images", 2009; IPSJ Transactions on Computer Vision and Applications.; pp. 1-22 (Year: 2009).*

* cited by examiner

*Primary Examiner* — Siamak Harandi
(74) *Attorney, Agent, or Firm* — Kunzler Bean & Adamson

(57) ABSTRACT

For displaying a subject composition, a method determines a subject number, a subject age category, and a subject size for one or more subjects of an image. The method further calculates a subject distribution that indicates a position for a face of each subject. In addition, the method determines a subject pose for each subject that indicates a body position for the subject. The method further displays the subject composition comprising the subject distribution and the subject poses overlaying a display image.

17 Claims, 16 Drawing Sheets

203 →

| Subject Height 211 |
| Subject Seated Height 213 |
| Subject Width 215 |

} 227

| Subject Clothing Colors 217 |
| Size Category 218 |
| Subject Clothing Style 219 |
| Subject Image 221 |
| Position Possibilities 222 |
| Subject Position 223 |
| Subject Pose 225 |
| Subject Age Category 229 |
| Subject Gender 231 |

| Image Type 230 | SAC 229 | PP 222 | Segment Identifier 247 | Prop Entry 205 | Pose 261 |
|---|---|---|---|---|---|
| Image Type 230 | SAC 229 | PP 222 | Segment Identifier 247 | Prop Entry 205 | Pose 261 |
| Image Type 230 | SAC 229 | PP 222 | Segment Identifier 247 | Prop Entry 205 | Pose 261 |
| Image Type 230 | SAC 229 | PP 222 | Segment Identifier 247 | Prop Entry 205 | Pose 261 |

DISPLAYING A SUBJECT COMPOSITION

CROSS-REFERENCE TO RELATED APPLICATIONS

This application claims priority to U.S. Provisional Patent Application 62/440,260 entitled "DISPLAYING A SUBJECT COMPOSITION" filed Dec. 29, 2016 for Rolf Herd, which is incorporated herein by reference.

FIELD

The subject matter disclosed herein relates to subject compositions and more particularly relates to displaying a subject composition.

BACKGROUND

Description of the Related Art

Amateur photographers often compose images of one or more subjects.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B is a schematic block diagram illustrating one embodiment of a subject entry;

DETAILED DESCRIPTION

Figure 1A:
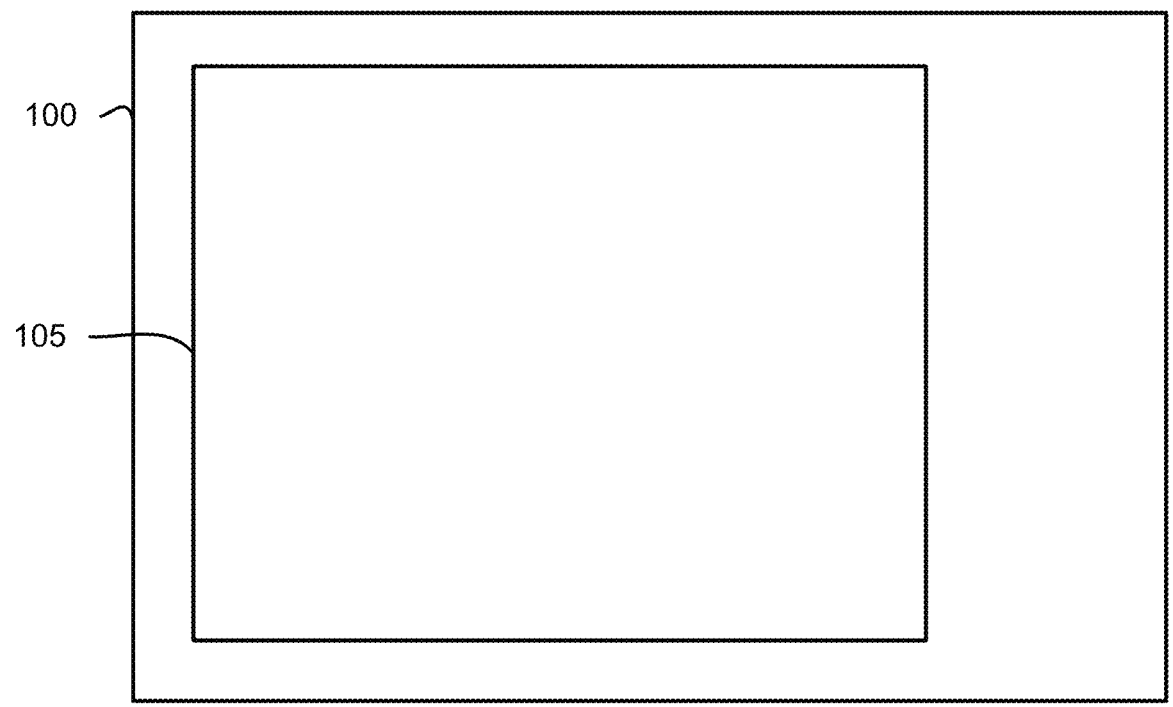
FIG. 1A is a schematic block diagram illustrating one embodiment of a camera.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a camera 100. The camera 100 may capture images including still images and/or video images. In the depicted embodiment, the camera 100 includes a display 105. A user may compose an image in the display 105 before capturing the image.

The quality of an image is greatly enhanced by the composition of the image. Unfortunately, most amateur photographers have little knowledge about attractive or interesting ways to compose the image. Amateur photographers typically distribute subjects within an image with little regard for balance or appearance. In addition, amateur photographers rarely pose their subjects. As a result, the image composition is often far less attractive and interesting than the composition could be if the amateur photographer had more knowledge of composition principles.

The embodiments described herein calculate a distinctive subject distribution and determine a subject pose for subjects of the image. The distinctive subject distribution prevents the image from having a template appearance, while providing an interesting and unique distribution of the subjects.

In the past, the calculation of the distinctive and artistic subject distribution has been computationally intractable for the processors of cameras 100. The embodiments employ data structures that significantly reduce the computational complexity of calculating the subject distribution, allowing for the calculation of a distinctive and artistic subject distribution with the processor of a camera.

In addition, the embodiments display a subject composition comprising the subject distribution and the subject poses overlaying the display image in the display 105. As a result, the photographer can direct the subjects to conform to the subject composition before capturing the image with the camera 100. Thus, the attractiveness, uniqueness, interest, and quality, of the captured image is greatly enhanced.

Figure 1B:
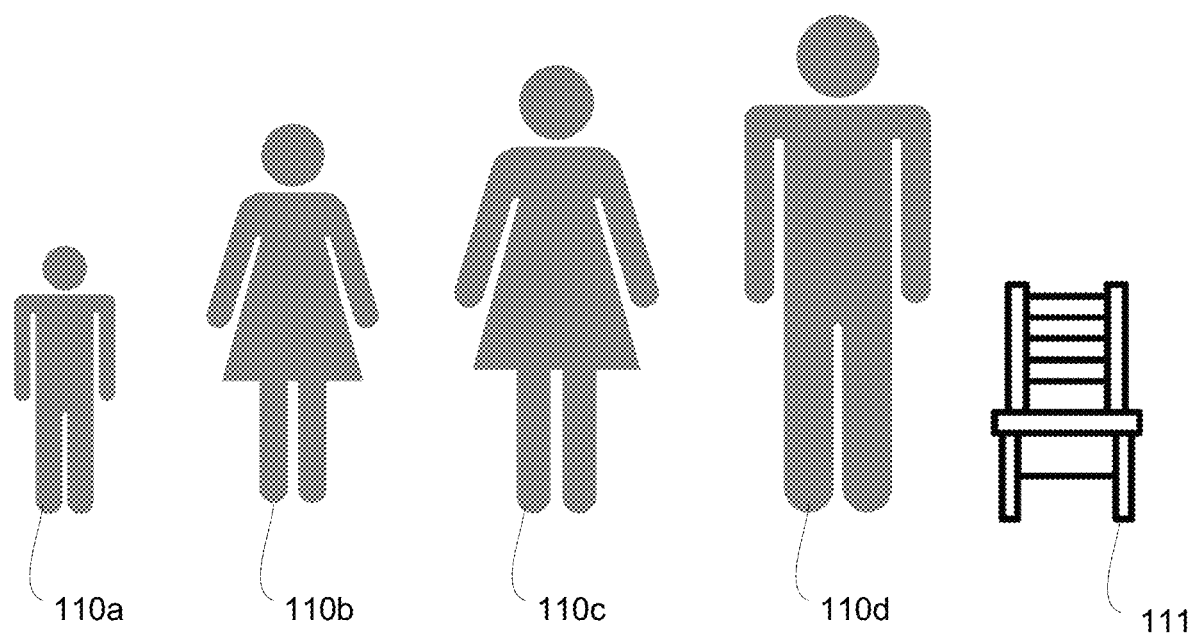
FIG. 1B is a schematic diagram illustrating one embodiment of subjects.

FIG. 1B is a schematic diagram illustrating one embodiment of subjects 110. Four exemplary subjects 110a-d of different sizes and a prop 111 are shown. The camera 100 may capture subject data about the subjects 110 as well as any potential props 111 such as chairs, benches, stools, walls, bleachers, and the like. In one embodiment, the subject data that includes a subject number, a subject height, a subject seated height, a subject width, subject clothing colors, subject clothing styles, subject images, and the like. The subject height, the subject seated height, and the subject width may be referred to collectively as a subject size. The subject data is described in more detail in FIGS. 2A-B.

Figure 2A:
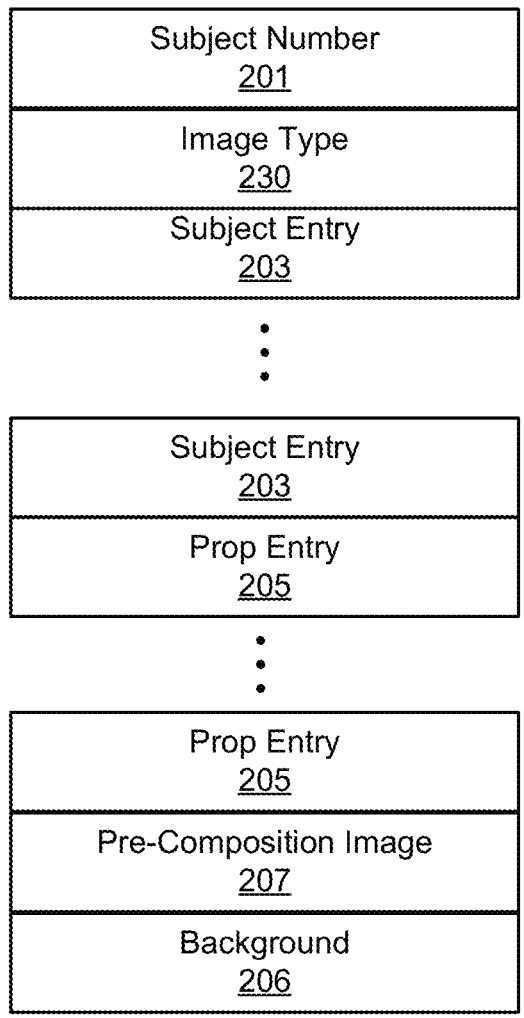
FIG. 2A is a schematic block diagram illustrating one embodiment of subject data.

FIG. 2A is a schematic block diagram illustrating one embodiment of the subject data 200. The subject data 200 maybe organized as a data structure in a memory. In the depicted embodiment, the subject data 200 includes a subject number 201, an image type 230, one or more subject entries 203, one or more prop entries 205, a pre-composition image 207, and a background 206.

The subject number 201 may specify a number of subjects 110 that are visible in the display 105. For example, the camera 100 may identify and count the subjects 110. In addition, the subject number 201 may specify a number of subjects 110 that will be in a subject composition. For example, a user may specify the number of subjects 110 in response to a prompt from the camera 100.

The image type 230 may be selected from the group consisting of formal, sporty, and casual. In addition, the image type 230 may be selected from the group consisting of formal, sporty, casual, architectural, candid, documentary, fashion, food, landscape, night, fine art, aerial, portraiture, athletics, and animal. In one embodiment, the image type 230 may be determined from a combination of one or more of the subject clothing style worn by the subjects 110, the background, the type of props 111, animals in the scene, movement in the scene, and the number of subjects 110.

The subject entries 203 are described in more detail in FIG. 2B. The prop entries 205 may identify a type of prop 111 and a number of the type of prop 111. In one embodiment, the prop entry 205 may identify a general type of the prop 111, such as a prop 111 that may be set upon, leaned upon, held, worn, and the like.

The pre-composition image 207 may be captured by the camera 100 prior to calculating a subject distribution and determining a subject pose. The background 206 may be calculated from the pre-composition image 207. In one embodiment, the subjects 110 are filtered from the background 206. In a certain embodiment, the background 206 includes a background type.

FIG. 2B is a schematic block diagram illustrating one embodiment of the subject entry 203. A subject entry 203 may be created for each subject 110 in a subject composition. In the depicted embodiment, the subject entry 203 includes the subject height 211, the subject seated height 213, the subject width 215, the subject clothing colors 217, a size category 218, the subject clothing style 219, subject images 221, position possibilities 222, a subject position 223, a subject pose 225, a subject age category 229, and a subject gender 231. The subject height 211, the subject seated height 213, and the subject width 215 may comprise a subject size 227.

The subject height 211 may estimate a height of the subject 110. The subject height 211 may be determined from the pre-composition image 207. In one embodiment, the height is measured in pixels. In addition, the height may be measured as a longitudinal field-of-view angle for the subject 110. The height may also estimate the longitudinal height of the subject 110 measured in linear units such as centimeters and/or inches. In one embodiment, the height is longitudinal calculated as a function of the field-of-view angle of the subject 110 and a field-of-view angle of an eye of the subject 110.

The subject seated height 213 may estimate a height of the seated subject 110. The subject seated height 213 may be determined from the pre-composition image 207. In one embodiment, the subject seated height 213 is calculated as a function of the subject height 110. Alternatively, the subject seated height 213 may be measured directly by the camera as a longitudinal field-of-view angle and/or pixel measure for the seated subject 110.

The subject width 215 may estimate a width of the subject 110. The subject width 215 may be determined from the pre-composition image 207. The width may be measured in pixels. In addition, the width may be measured as a latitudinal field-of-view angle for the subject 110. In one embodiment, the subject width 215 is calculated as a function of the longitudinal height and a latitudinal field-of-view angle of the subject 110.

The subject clothing colors 217 may specify one or more colors of clothing worn by the subject 110. The subject clothing colors 217 may be determined from the pre-composition image 207. In one embodiment, colors with a color area that exceeds a color area threshold may be specified by the subject clothing colors 217. The color area threshold may be in the range of 5 to 20% of the total area of clothing worn by the subject 110. In addition, the subject clothing colors 217 may specify a spectral average of all colors of the clothing worn by the subject 110.

The size category 218 may specify one of a small category and a large category based on the subject size 227. Each subject 110 may be classified as one of the small category and the large category, reducing the computational complexity of categorizing the subjects 110. In one embodiment, a size threshold is determined as a function of the image type 230. Subjects 110 with the subject size 227 below the size threshold may be classified as the small category and all other subjects 110 may be classified as the large category.

The subject clothing style 219 may specify a style of the clothing worn by the subject 110. The subject clothing style 219 may be determined from the pre-composition image 207. In one embodiment, the style is determined by a pattern recognition algorithm. Alternatively, the style of the clothing may be entered through a user interface of the camera 100 by the user. The subject clothing style 219 may be selected from the group consisting of formal, sporty, casual, and athletic.

The subject images 221 may record images of the subject 110 from the pre-composition image 207. The subject images 221 may include a facial image, a partial body image, and/or a full body image. The subject images 221 may be used to determine the subject height 211, the subject seated height 213, the subject width 215, the subject clothing colors 217, and the subject clothing style 219. The subject images 221 may be used to generate a posing silhouette as will be described hereafter.

The position possibilities 222 may specify one or more possible positions for the subject 110. In one embodiment, the position possibilities 222 are determined as a function of the background 206. In addition, the position possibilities 222 may be determined as a function of the available props 111. For example, only positions that are supported by the background 206 and the available props 111 may be specified as position possibilities 222.

The subject position 223 may specify a position of the subject 110 within the subject composition. The determination of the subject position 223 is described hereafter in FIG. 5B.

The subject pose 225 may specify a pose for the subject 110. The subject pose 225 may indicate a body position for the subject 110. Each subject pose 225 may include posing instructions for posing the subject 110. In addition, each subject pose 225 may include a posing silhouette as will be described hereafter. In one embodiment, the subject pose 225 is selected from a pose database that is described hereafter in FIG. 2E. The determination of the subject pose 225 is described hereafter in FIG. 5A.

The subject age category 229 may estimate an age category for the subject 110. The subject age category 229 may be determined from the pre-composition image 207. Each age category may specify an age range. The age category may be determined by a pattern recognition algorithm. Alternatively, the age category may be specified by the user through the user interface of the camera 100.

In one embodiment, the subject age category 229 modifies the size category 218. The large age category may be estimated for subjects 110 with a subject size 227 within 25% of the size threshold and an age greater than an age threshold while the small age category may be estimated for subjects 110 with a subject size 225 within 25% of the size threshold and an age less than or equal to the age threshold. The age threshold may be in the range of 10 to 13 years of age.

The subject gender 231 may specify the gender of the subject 110. The subject gender 231 may be determined from the pre-composition image 207. The gender may be determined by a pattern recognition algorithm. In addition, the gender may be specified by the user through the user interface of the camera 100.

Figure 2C:
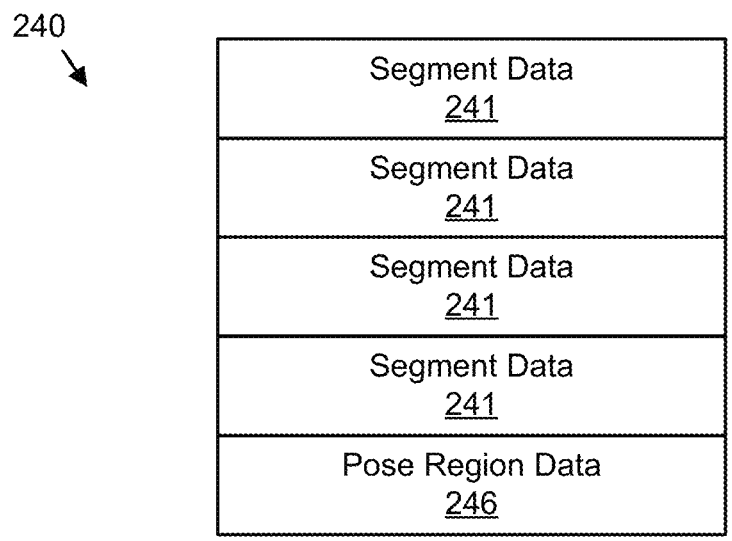
FIG. 2C is a schematic block diagram illustrating one embodiment of pose data.

FIG. 2C is a schematic block diagram illustrating one embodiment of pose data 240. The pose data 240 may be used to calculate the subject distribution for the subject composition. The pose data 240 may be organized as a data structure in a memory. In the depicted embodiment, the pose data 240 includes a plurality of segment data 241 and pose region data 246.

The pose region data 246 may describe a pose region within the display 105. In one embodiment, the pose region is a subset of the display 105. Alternatively, the pose region may include all of the display 105. The segment data 241 comprises data for a pose segment and is described in more detail in FIG. 2D.

The pose data 240 is organized as segment data 241 for a pose region to improve the function of a computer disposed in the camera 100 when calculating the subject distribution for the subjects 110. Calculating a subject distribution can be computationally intractable for a camera 100 because of the many possible subject distributions. Dividing the pose data 240 into segment data 241 significantly reduces the computational complexity, with the segment data 241 further optimized for reducing the computational complexity as will be described hereafter.

Figure 2D:
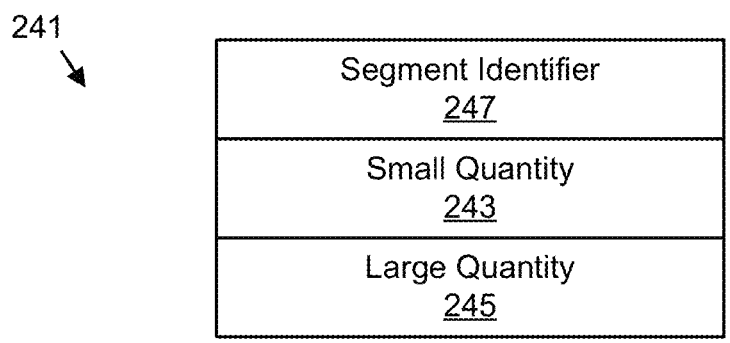
FIG. 2D is a schematic block diagram illustrating one embodiment of segment data.

FIG. 2D is a schematic block diagram illustrating one embodiment of the segment data 241. In the depicted embodiment, the segment data 241 includes a segment identifier 247, a small quantity 243, and a large quantity 245. The subject identifiers 247 may uniquely identify the segment data 241 and a corresponding pose segment.

The small quantity 243 may specify a number of subjects 110 with the subject size 227 that is the small category. The large quantity 245 may specify the number of subjects 110 with the subject size 227 that is the large category. The use of the small quantity 243 and the large quantity 245 improves the performance of the computer by identifying a subset of the subject data 200 that is most relevant in optimizing the subject composition, and significantly reducing the computational complexity of calculating the subject distribution.

Figure 2E:
FIG. 2E is a schematic block diagram illustrating one embodiment of a pose database.

FIG. 2E is a schematic block diagram illustrating one embodiment of a pose database 260. The pose database 260 may be used to determine a subject pose 225 for each subject 110. The pose database 260 may be organized as a data structure in a memory. In the depicted embodiment, the pose database 260 includes one or more of the image type 230, the subject age category 229, the posing possibilities 222, the segment identifier 247, the prop entry 205, and a pose 261. Although for simplicity the pose database 260 is shown with only four entries, the pose database 260 may include any number of entries.

In one embodiment, one or more of the image type 230, the subject age category 229, the posing possibilities 222, the segment identifier 247, and the prop entry 205 are indexes for determining the pose 261 to select as the subject pose 225 for a subject 110. For example, the embodiments may determine the image type 230, the segment identifier 247, and the subject age category 229 and use the image type 230, the segment identifier 247, and the subject age category 229 to determine the pose 261.

In one embodiment, the pose 261 for the subject pose 225 is determined as a function of the image type 230 using the image type 230 as the index. In addition, the pose 261 for the subject pose 225 may be determined as a function of the image type 230 and the subject age category 229, using the image type 230 and the subject age category 229 as the indexes to the pose database 260. In a certain embodiment, the pose 261 for the subject pose 225 is determined as a function of the image type 230, the subject age category 229, and the segment 125, using the image type 230, the subject age category 229, and the segment identifier 247 as indexes to the pose database 260. In one embodiment, the pose 261 for the subject pose 225 is determined as a function of the image type 230, the subject age category 229, the segment 125, and the prop entry 205, using the image type 230, the subject age category 229, the segment identifier 247, and the prop entry 205 as indexes to the pose database 260. In one embodiment, the prop entry 205 may specify a general type of prop 111, such as a prop 111 that may be set upon, leaned upon, held, worn, and the like.

Each pose 261 may include posing instructions for posing the subject 110. In one embodiment, the posing instructions specify steps for conforming the subject's body position to the subject pose 225. In addition, each pose 261 may include a posing silhouette as will be described hereafter.

Figure 3A:
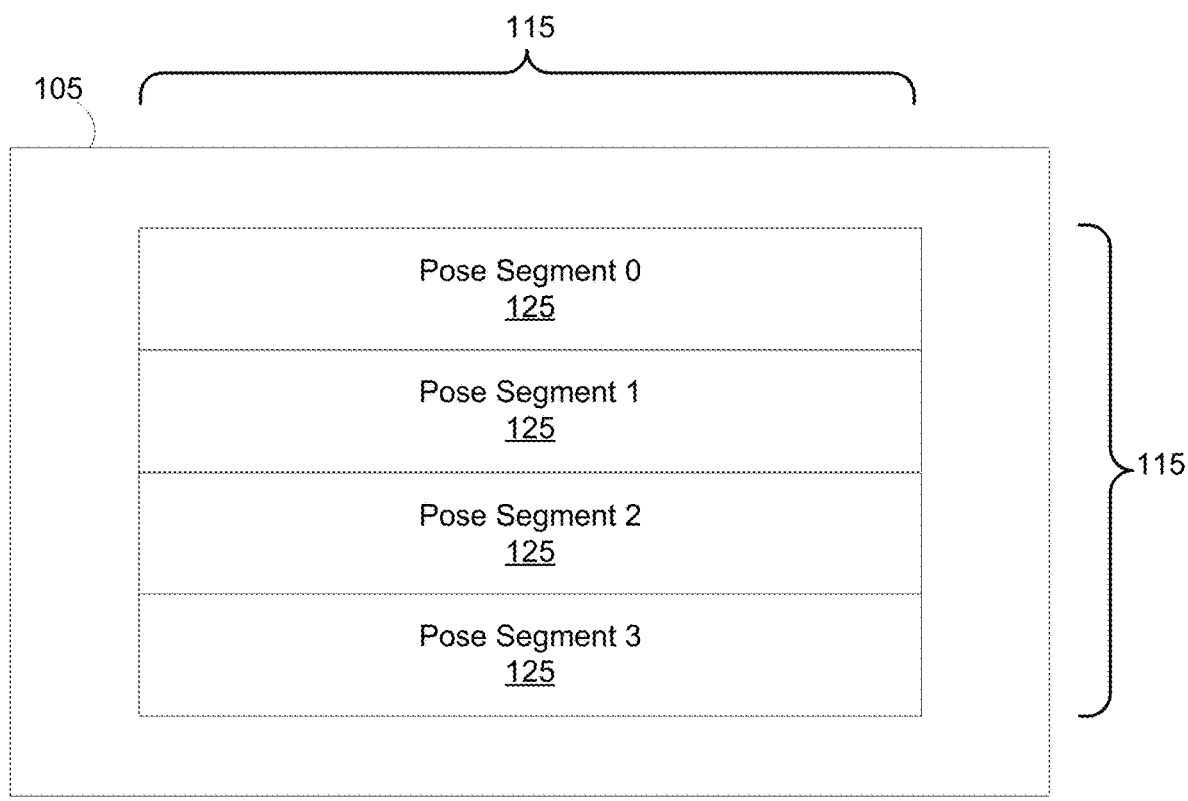
FIG. 3A is a schematic drawing illustrating one embodiment of a pose region with pose segments.

FIG. 3A is a schematic drawing illustrating one embodiment of a pose region 115 with pose segments 125. In the depicted embodiment, the display 105 is shown. The pose region 115 is defined within the display 105 and described by the pose region data 246. The pose region 115 comprises a plurality of pose segments 125. The pose segments 125 are described by the segment data 241.

Figure 3B:
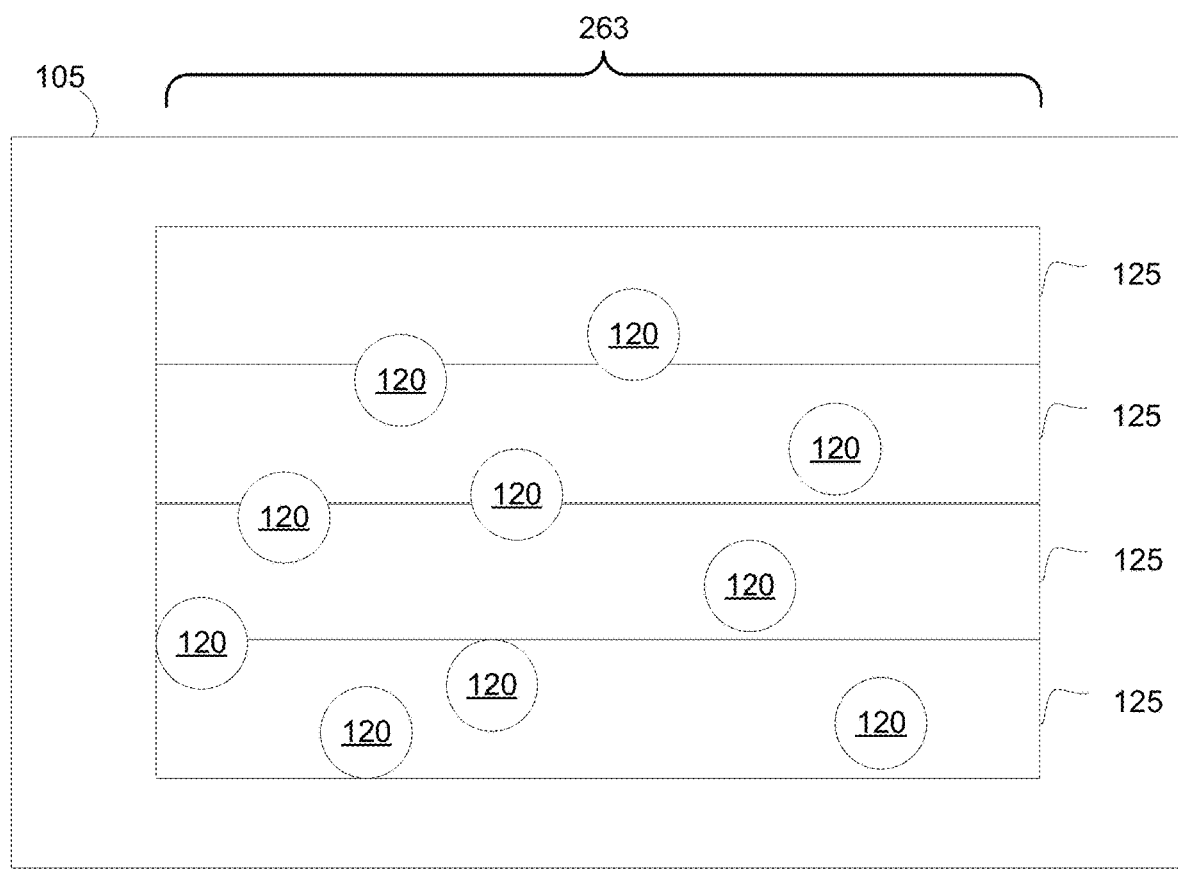
FIG. 3B is a schematic drawing illustrating one embodiment of subjects distributed in the pose segments.

FIG. 3B is a schematic drawing illustrating one embodiment of subjects 110 distributed in the pose segments 125. In the depicted embodiment, the face 120 of each subject 110 is distributed in the pose segments 125. The distribution of the faces 120 forms a subject distribution 263.

Figure 3C:
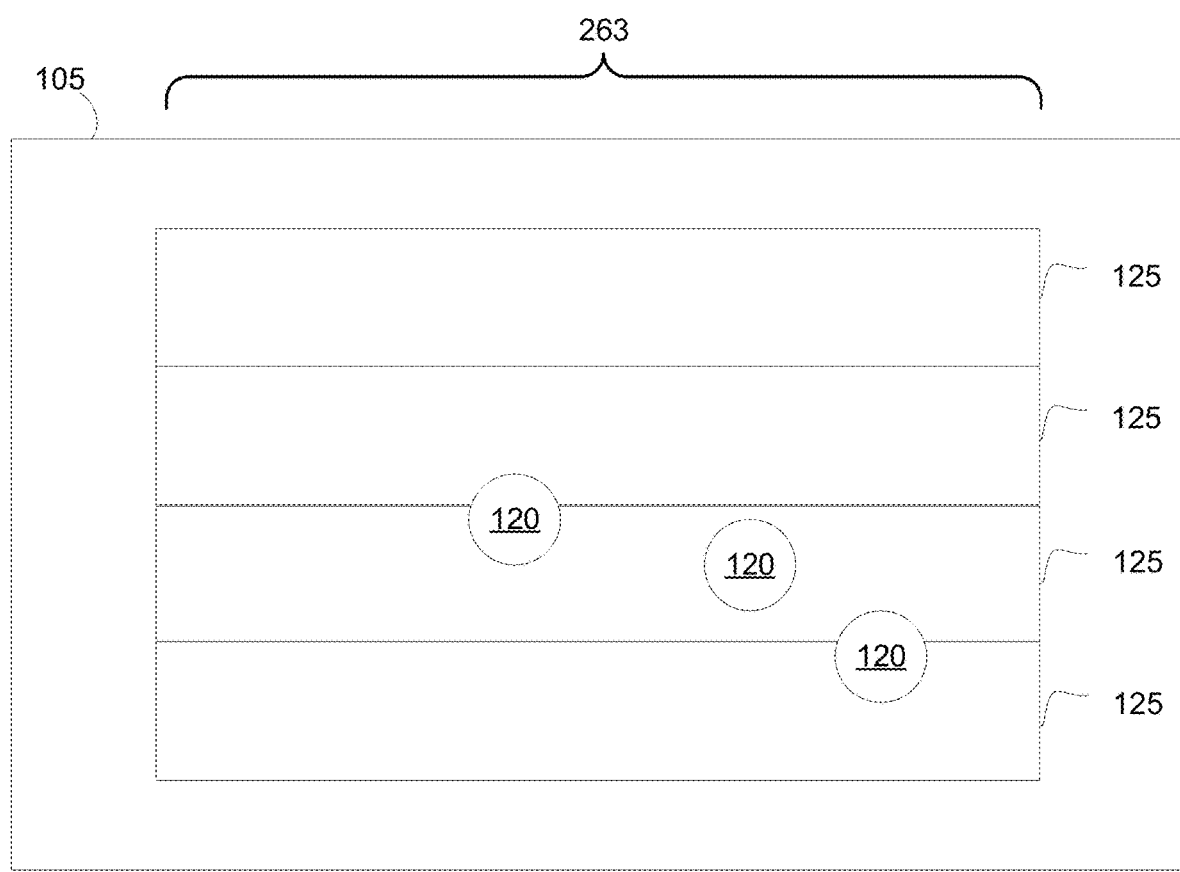
FIG. 3C is a schematic drawing illustrating one alternate embodiment of subjects distributed in the pose segments.
Figure 3D:
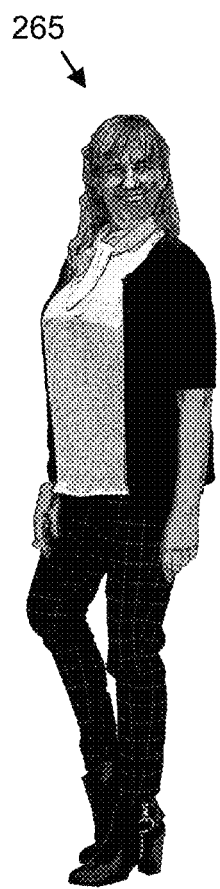
FIGS. 3D-G are illustrations one embodiment of subject poses.
Figure 3E:
Figures 3F, 3G:

FIG. 3C is a schematic drawing illustrating one alternate embodiment of subjects 110 distributed in the pose segments 125. In the depicted embodiment, the face 120 of each subject 110 is distributed in the pose segments 125 the distribution of the faces 120 as calculated as part of the subject distribution 263. The calculation of the subject distribution 263 and the distribution of the faces 120 is described hereafter.

FIGS. 3D-G are illustrations one embodiment of posing silhouettes 265. In one embodiment, the posing silhouettes 265 include an image of a model in a desired pose. Alternatively, the posing silhouettes 265 include an outline and/or silhouette outlining the desired pose. In one embodiment, the posing silhouettes 265 includes an image of the subject 110. For example, the face 120 of the subject 110 may be a superimposed on the posing silhouette 265.

Figure 4A:
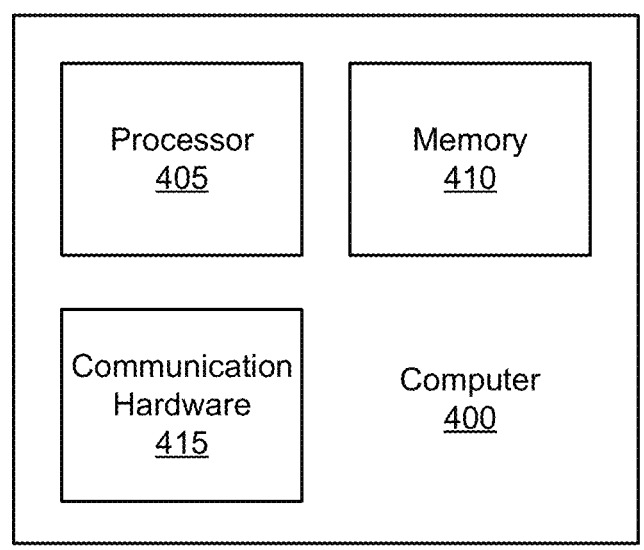
FIG. 4A is a schematic block diagram illustrating one embodiment of the computer.

FIG. 4A is a schematic block diagram illustrating one embodiment of the computer 400. The computer 400 may be embodied in the camera 100. In the depicted embodiment, the computer 400 includes a processor 405, a memory 410, and communication hardware 415. The memory 410 may include a semiconductor storage device, hard disk drive, a micromechanical storage device, an optical storage device, or combinations thereof. The memory 410 may store code. The processor 405 may execute the code. The communication hardware 415 may communicate with other devices such as the display 105.

Figure 4B:
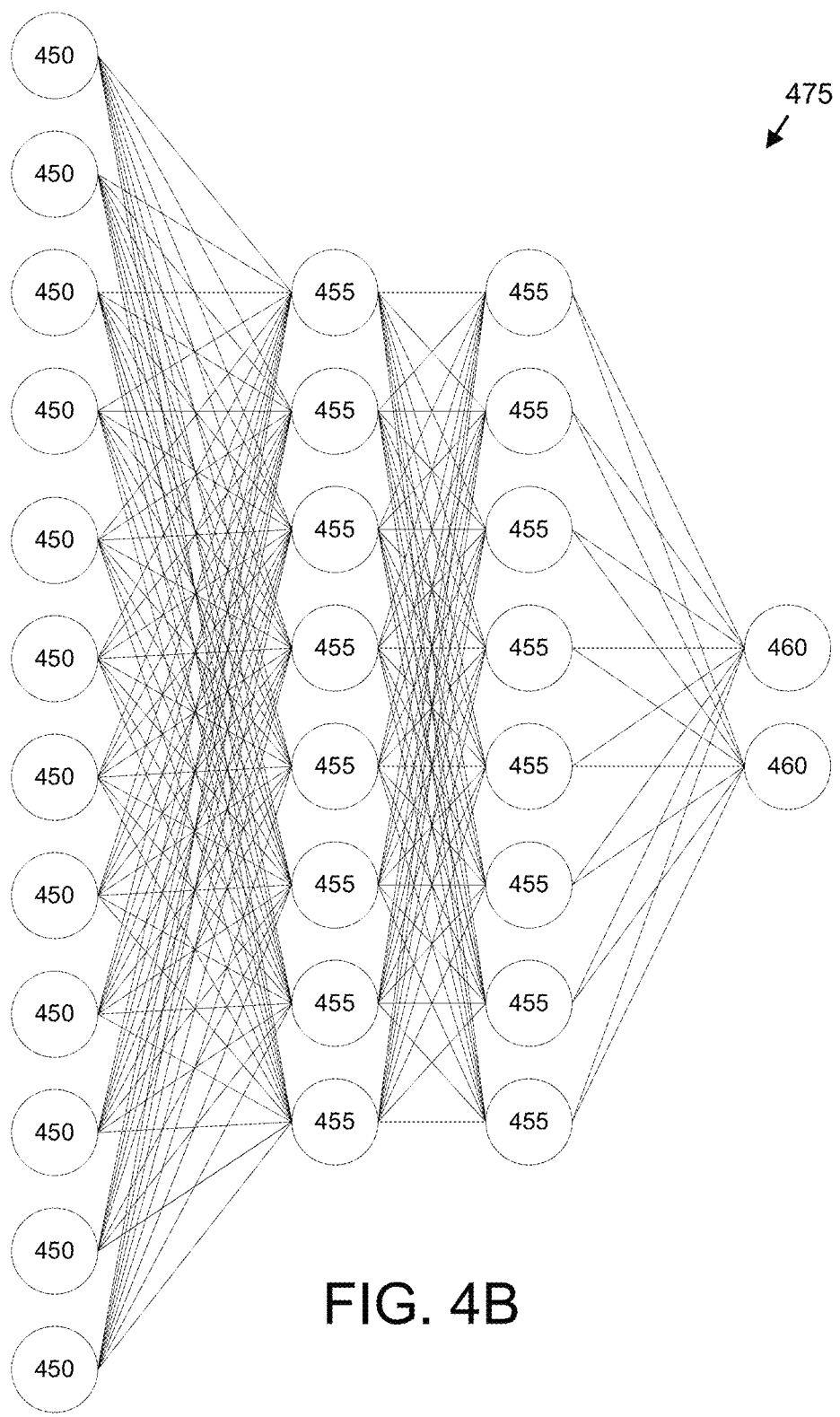
FIG. 4B is a schematic block diagram illustrating one embodiment of a neural network.

FIG. 4B is a schematic block diagram illustrating one embodiment of a neural network 475. The neural network 475 may be trained to identify one or more patterns and/or execute a pattern recognition algorithm. In the depicted embodiment, the neural network 475 includes a plurality of input neurons 450, a plurality of hidden neurons 455, and a plurality of output neurons 460. The neural network 475 may be trained by presenting input data such as the background 206, the subject images 221, or combinations thereof to the input neurons 450 while specifying the values of the output neurons 460. For example, the output neurons 460 may represent image types 230, subject clothing styles 219, subject age categories 229, subject genders 231, props 111, backgrounds 206, and the like. The hidden neurons 455 may be allowed to settle to configurations as directed by a learning algorithm over repeated presentations of input data. As a result, the neural network 475 may be trained to recognize one or more specified patterns.

For example, the pre-composition image 207 and/or subject images 221 may be presented to the neural network 475 and the neural network 475 may determine the image type 230 and/or the subject clothing styles 219. In addition, the neural network 475 may determine the subject age categories 229, subject gender 231, props 111, and/or background 206 from the pre-composition image 207 and/or each subject image 221.

Figure 5A:
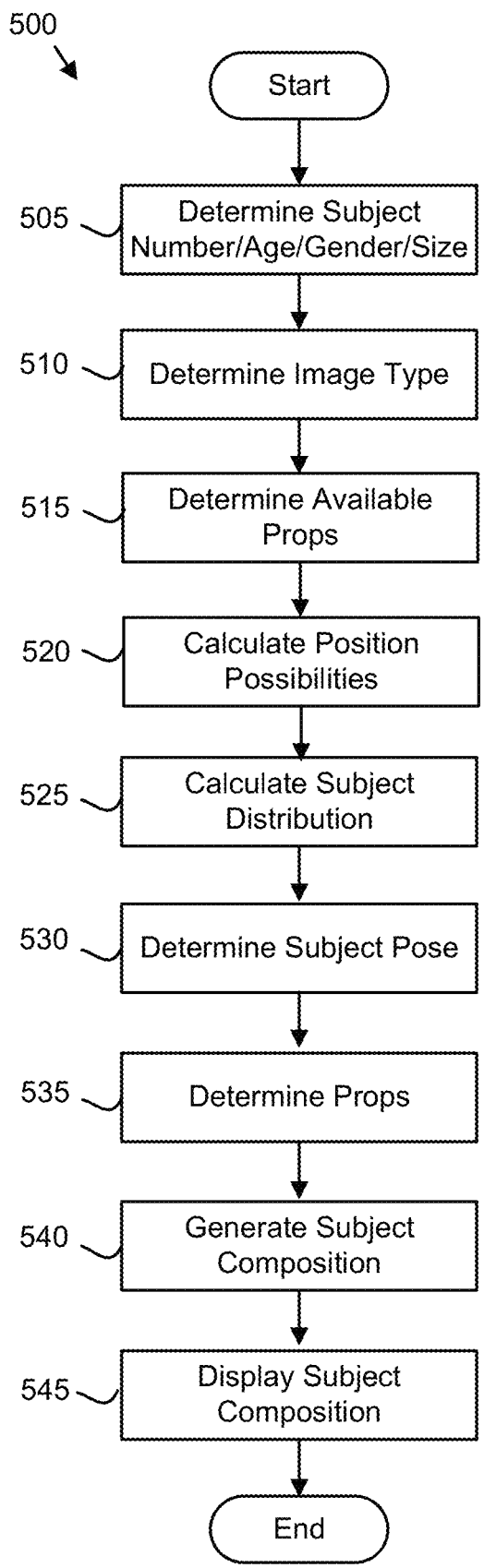
FIG. 5A is a schematic flow chart diagram illustrating one embodiment of a subject composition method.

FIG. 5A is a schematic flow chart diagram illustrating one embodiment of a subject composition method 500. The method 500 may determine subject poses 225 and the subject distribution 263 and display a subject composition comprising the subject distribution 263 and the subject poses 225. The method 500 may be performed by the camera 100 and/or a processor of the camera 100.

The method 500 starts, and in one embodiment, the processor 405 determines 505 one or more of the subject number 201, the subject age category 229, the subject gender 231, and the subject size 227 for one or more subjects 110 of the pre-composition image 207. The pre-composition image 207 may be captured by the camera 100 and/or displayed within the display 105. In one embodiment, the processor 405 captures and stores one or more of a facial image, a partial body image, and/or a full body image of each subject 110 from the pre-composition image 207 as subject images 221. The processor 405 may further distinguish the subjects 110 to determine the subject number 201.

In one embodiment, the processor 405 employs a pattern recognition algorithm to determine the subject age category 229 and/or subject gender 231 for each subject 110. The pattern recognition algorithm may be executed on the neural network 475.

In a certain embodiment, the processor 405 calculates the subject height 211, the subject seated height 213, and the subject width 215. In addition, the processor 405 may determine 505 the subject clothing colors 217 and the subject clothing styles 219. In one embodiment, the processor 405 employs a pattern recognition algorithm to determine the subject clothing colors 217 and/or the subject clothing styles 219.

The processor 405 may determine 510 the image type 230. In one embodiment, the processor 405 determines 510 the image type 230 from the subject clothing style 219 for each subject 110. In addition, the processor 405 may determine 510 the image type 230 as a function of the clothing styles 219 and the background 206. In one embodiment, the processor 405 employs a pattern recognition algorithm to determine the image type 230. Alternatively, the processor may receive the image type 230 from the user through a user interface of the camera 100.

The processor 405 may determine 515 available props 111. In one embodiment, the processor 405 may determine 515 the available props 111 from the pre-composition image 207 using a pattern recognition algorithm. In addition, the processor 405 may determine 515 the available props 111 from a scan of the immediate area by the camera 100. The camera 100 may prompt the user to scan the immediate area. In addition, the processor may determine 515 available props 111 from a prop file listing available props 111.

The processor 405 may calculate 520 the position possibilities 222 for each of the subjects 110 using the one or more available props 111. For example, the position possibilities 222 may include a first subject 110 standing, the first subject 110 seated in a chair prop 111, and the first subject 110 seated on the ground. The position possibilities 222 may include all possible positions of the subjects 110. Alternatively, the position possibilities 222 may include a reduced set of the possible positions. In one embodiment, the position possibilities 222 may be reduced based on the subject age category 229 and/or the subject gender 231.

The processor 405 may calculate 525 the subject distribution 263. The subject distribution 263 may indicate a position for a face 120 of each subject 110. The subject distribution 263 may be calculated 525 using the pose data 240 and the segment data 241 to reduce the computational complexity of the calculation as will be described hereafter in FIG. 5B.

Alternatively, the subject distribution 263 may be calculated 525 as a function of the subject number 201, the subject age categories 229, and/or the subject sizes 227. In addition, the subject distribution 263 may be calculated 525 as a function of the position possibilities 222.

The processor 405 may determine 530 the subject pose 225 for each subject 110. In one embodiment, one or more of the image type 230, the subject age category 229, the segment identifier 247, and the prop entries 205 are used as indices to select one or more poses 261 for the subject pose 225 from the pose database 260. In a certain embodiment, the pose 261 for the subject pose 225 is selected based on the subject distribution 263. In one embodiment, each subject pose 225 comprises posing instructions for conforming the subject's body position to the subject pose 225.

In one embodiment, each subject pose 225 comprises a posing silhouette 265. The posing silhouette 265 may be presented on the display 105. The posing silhouette 265 may comprise an outline of an exemplary subject. Alternatively, the posing silhouette 265 may comprise an image of an exemplary subject. For example, the posing silhouette 110 may show the image of a child model.

In a certain embodiment, the posing silhouette 265 comprises the subject image 221. For example, the posing silhouette 265 may include a facial image from the subject image 221 with an outline showing the desired body position for the subject 110.

The processor 405 may determine 535 one or more props 111 that are used by the subjects 110 in the respective subject poses 225. In one embodiment, a prop 111 is required by a subject pose 225. Alternatively, the prop 111 may be presented as an option for the subject pose 225.

The processor 405 may generate 540 the subject composition. The subject composition may comprise the subject distribution 263 for the subjects 110 and the subject pose 225 for each subject 110. In addition, the processor 405 may display 545 the subject composition overlaying the display image on the display 105 and the method 500 ends.

Figure 5B:
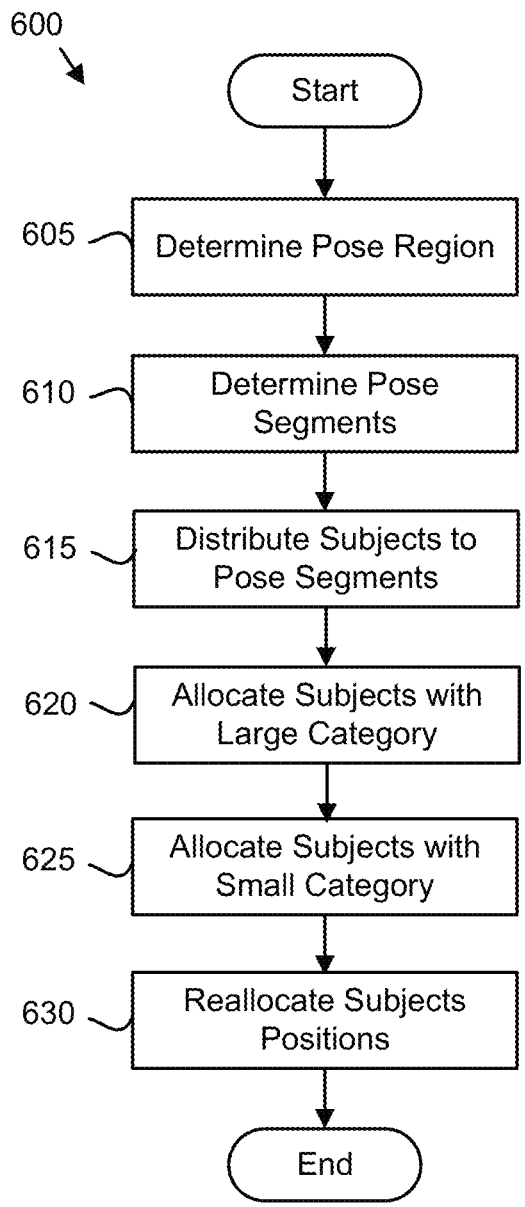
FIG. 5B is a schematic flow chart diagram illustrating one embodiment of a subject distribution calculation method.

FIG. 5B is a schematic flow chart diagram illustrating one embodiment of a position possibility calculation method 600. The method 600 may calculate the subject distribution 263. In one embodiment, the method 600 performs the calculate subject distribution step 525 of FIG. 5A. The method 600 may be performed by the camera 100 and/or the processor 405.

The method 600 starts, and in one embodiment, the processor 405 determines 605 the pose region 115 within the display 105. In one embodiment, the pose region 115 is determined 605 as a function of the image type 230. In addition, the pose region 115 may be determined 605 as a function of the image type 230 and the background 206.

The processor 405 further determine 610 the pose segments 125 within the pose region 115. In one embodiment, the pose segments 125 are determined 610 as a function of the subject number 201. Alternatively, the pose segments 125 may be determined 610 as a function of the image type 230. In one embodiment, the maximum number of pose segments 125 is four. Alternatively, the maximum number of pose segments 125 may be three. In a certain embodiment, the maximum number of pose segments 125 is two.

The processor 405 may distribute 615 the one or more subjects 110 to the pose segments 125. In one embodiment, no subjects 110 with a large category size category 218 are distributed 615 to the lowest elevation pose segment 125. In addition, no subjects 110 with a small category size category 218 may be distributed 615 to the highest elevation pose segment 125.

In one embodiment, the subjects 110 are distributed 615 based on one or more lookup tables as a function of the subject number 201, a number of subject entries 203 with a small category size category 218, and a number of subject entries 203 with a large category size category 218. The use of a lookup table based on the subject number 201, the number of subject entries 203 with the small category size category 218, and the number of subject entries 203 with the large category size category 218 greatly reduces the computational complexity of distributing 615 the subjects 110 to the pose segments 125. In one embodiment, the lookup table is selected based on the subject number 201, the number of small category subject entries 203, and the number of large category subject entries 203.

For example, the subjects 110 may be distributed 615 as shown in Table 1 for a subject number 201 of four, a number of small category subject entries 203 of three, and the number of large category subject entries 203 of one, wherein distribution separated by a comma represent a random selection of one of the values in the cell.

TABLE 1

|           | Large Category | Small Category |
|-----------|----------------|----------------|
| Segment 0 | 0              | 0              |
| Segment 1 | 0              | 0.3            |
| Segment 2 | 0.1            | 3.0            |
| Segment 3 | 0              | 1.0            |

For each pose segment 125, the processor 405 further allocates 620 subjects 110 with the large category to the pose segment 125. The processor 405 may allocate 620 each subject 110 by specifying a subject position 223 within the pose segment 125 for the subject 110.

In one embodiment, the subject position 223 is calculated as a function of a position radius r. The position radius may be calculated using Equation 1, where γ is a floating-point constant and n is the subject number 201. In a certain embodiment, γ is equal to 1.6.

$$r = \sqrt{\frac{\gamma}{\pi n}} \qquad \text{Equation 1}$$

In one embodiment, the processor 405 calculates an upper bound UB and a lower bound LB as a function of the radius r using Equations 2 and 3, where ϵ is a floating-point constant. In a certain embodiment, ϵ is equal to 0.01.

$$UB = r + \epsilon \qquad \text{Equation 2}$$

$$LB = r - \epsilon \qquad \text{Equation 3}$$

In addition, a horizontal coordinate x and a vertical coordinate y may be randomly generated by the processor 405, subject to constraints. In one embodiment, x and y satisfy Equations 4 and 5, where X MAX and Y MAX are floating-point constants. In a certain embodiment, X MAX is equal to 1.0 and Y MAX is equal to 0.25.

$$0<x<X\ MAX \qquad \text{Equation 4}$$

$$0<y<Y\ MAX \qquad \text{Equation 5}$$

In a certain embodiment, each pose segment 125 includes a chosen segment floating point value. In one embodiment, the vertical coordinate y may be adjusted to an absolute value by adding the chosen segment floating point value to the vertical coordinate.

In one embodiment, the horizontal coordinate x and the vertical coordinate y are modified to fit within the posing area 115. The horizontal coordinate x and the vertical coordinate y may be adjusted to a corrected horizontal coordinate CX and a corrected vertical coordinate CY respectively using Equations 6 and 7, where TM is a floating-point top margin constant, BM is a floating-point bottom margin constant, RM is a floating-point right margin constant, and LM is a floating-point left margin constant.

$$CX=x(RM-LM)+LM \qquad \text{Equation 6}$$

$$CY=y(TM-BM)+BM \qquad \text{Equation 7}$$

In one embodiment, the corrected coordinates CX and CY are randomly assigned to a subject 110 that is allocated to the pose segment 125 as the subject position 223. In a certain embodiment, the corrected coordinates are adjusted so that each subject position 223 is within the upper bound UB of at least one other subject position 223 and at least the lower bound LB from all other subject positions 223.

In response to allocating 620 subjects 110 with the large category, the processor 405 allocates 625 subjects 110 with the small category to the pose segment 125. The processor 405 may allocate 625 each subject 110 by specifying a subject position 223 within the pose segment 125 for the subject 110. The subjects 110 with the small category may be allocated 625 to the pose segment 125 using Equations 1-7.

In a certain embodiment, the subject positions 223 are iteratively reallocated 630 so that each subject position 223 is within the upper bound UB of at least one other subject position 223 and at least the lower bound UB from all other subject positions 223 and the method 600 ends. As a result, the subjects 110 are allocated 620/625 with a pseudorandom process that generates a unique and pleasing subject composition.

Figure 6:
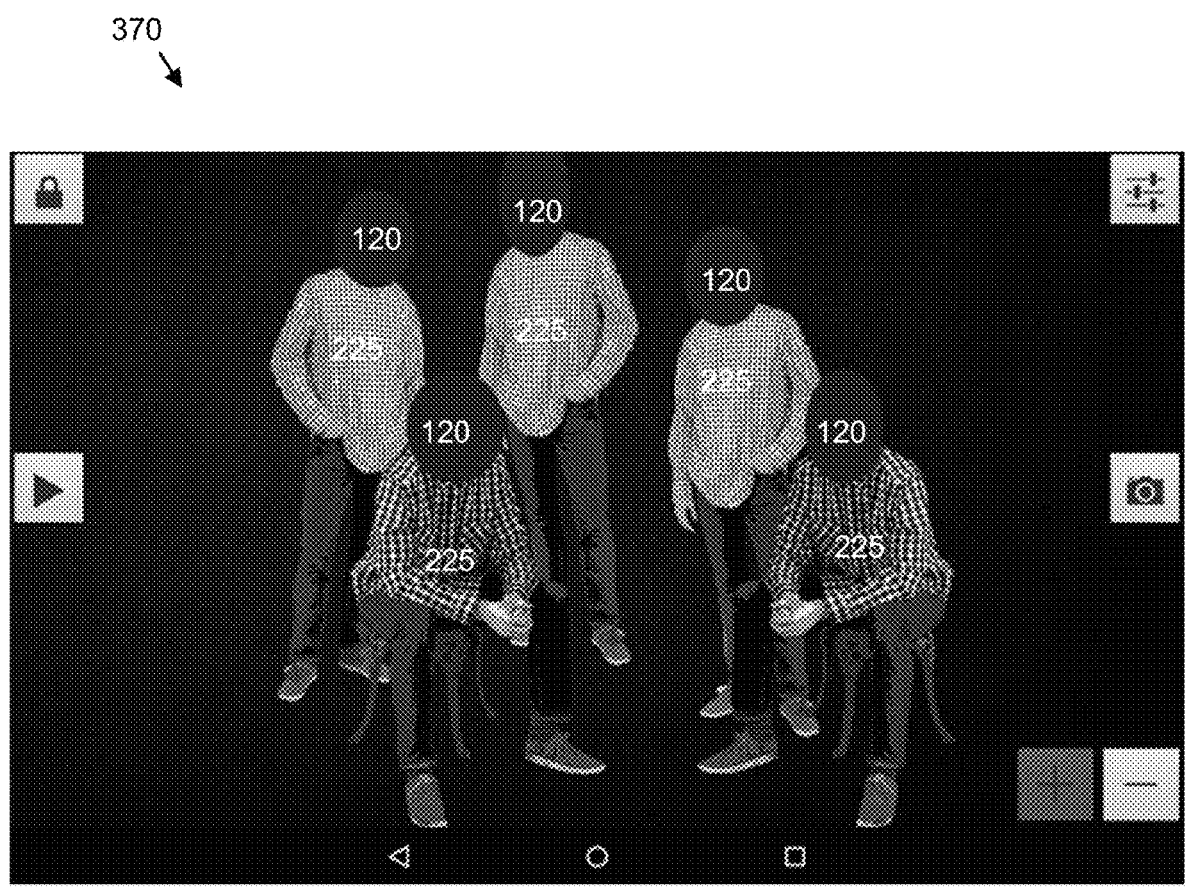
FIG. 6 is a drawing illustrating one embodiment of a subject composition.

FIG. 6 is a drawing illustrating one embodiment of a subject composition 370. The subject composition 370 is generated by calculating the subject distribution 263 that indicates a position for a face 120 of each subject 110 and determining the subject pose 225 for each subject 110.

The embodiments calculate the subject distribution 263 and determine the subject poses 225 for a subject composition using pose data 240 and segment data 241 that greatly reduces the computational complexity of calculating the subject distribution 263 while generating a distinctive and highly attractive subject distribution 263. As a result, the subject distribution 263 may be calculated using the more limited computational resources of the camera 100. The use of the pose data 240 and the segment data 241 also calculates the subject distribution 263 that does not have the appearance of a photographic template and that appears artistic and unique. As a result, even amateur photographers can produce highly artistic subject compositions.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining, by use of a processor, a subject number, a subject age category, and a subject size for one or more subjects of an image;
   calculating a subject distribution that indicates a position for a face of each subject by;
      determining a pose region within a display;
      determining pose segments within the pose region;
      distributing the one or more subjects to the pose segments;
      for each pose segment, allocating subjects with a large category to the pose segment, then allocating subjects with a small category to the pose segment;
      iteratively reallocating each subject that is not within a minimum distance or another subject;
   determining a subject pose for each subject that indicates a subject position for the subject; and
   displaying a subject composition comprising the subject distribution and the subject poses overlaying a display image.

2. The method of claim 1, the method further comprising determining an image type, wherein the image type is selected from the group consisting of formal, sporty, and casual.

3. The method of claim 1, wherein the subject pose is determined as a function of an image type.

4. The method of claim 1, wherein the subject pose is determined as a function of an image type and subject age category.

5. The method of claim 1, wherein the subject pose is determined as a function of an image type, subject age category, and pose segment.

6. The method of claim 1, wherein each subject pose comprises posing instructions.

7. The method of claim 1, wherein each subject pose comprises a posing silhouette.

8. The method of claim 4, wherein the posing silhouette comprises an image of the subject.

9. An apparatus comprising:
   a processor;
   a memory storing code executable by the processor to perform:
   determining a subject number, a subject age category, and a subject size for one or more subjects of an image;
   calculating a subject distribution that indicates a position for a face of each subject by;
      determining a pose region within a display;
      determining pose segments within the pose region;
      distributing the one or more subjects to the pose segments;
      for each pose segment, allocating subjects with a large category to the pose segment, then allocating subjects with a small category to the pose segment;
      iteratively reallocating each subject that is not within a minimum distance or another subject;
   determining a subject pose for each subject that indicates a subject position for the subject; and
   displaying a subject composition comprising the subject distribution and the subject poses overlaying a display image.

10. The apparatus of claim 9, the method further comprising determining an image type, wherein the image type is selected from the group consisting of formal, sporty, and casual.

11. The apparatus of claim 9, wherein the subject pose is determined as a function of an image type.

12. The apparatus of claim 9, wherein the subject pose is determined as a function of an image type and subject age category.

13. The apparatus of claim 9, wherein the subject pose is determined as a function of an image type, subject age category, and pose segment.

14. The apparatus of claim 9, wherein each subject pose comprises posing instructions.

15. The apparatus of claim 9, wherein each subject pose comprises a posing silhouette.

16. The apparatus of claim 15, wherein the posing silhouette comprises an image of the subject.

17. A program product comprising a non-transitory computer readable storage medium that stores code executable by a processor to perform:

determining a subject number, a subject age category, and a subject size for one or more subjects of an image;

calculating a subject distribution that indicates a position for a face of each subject by;

determining a pose region within a display;

determining pose segments within the pose region;

distributing the one or more subjects to the pose segments;

for each pose segment, allocating subjects with a large category to the pose segment, then allocating subjects with a small category to the pose segment;

iteratively reallocating each subject that is not within a minimum distance or another subject;

determining a subject pose for each subject that indicates a subject position for the subject; and displaying a subject composition comprising the subject distribution and the subject poses overlaying a display image.

* * * * *